W. L. BURT.
Car Brake.
No. 49,082.
Patented Aug. 1, 1865.
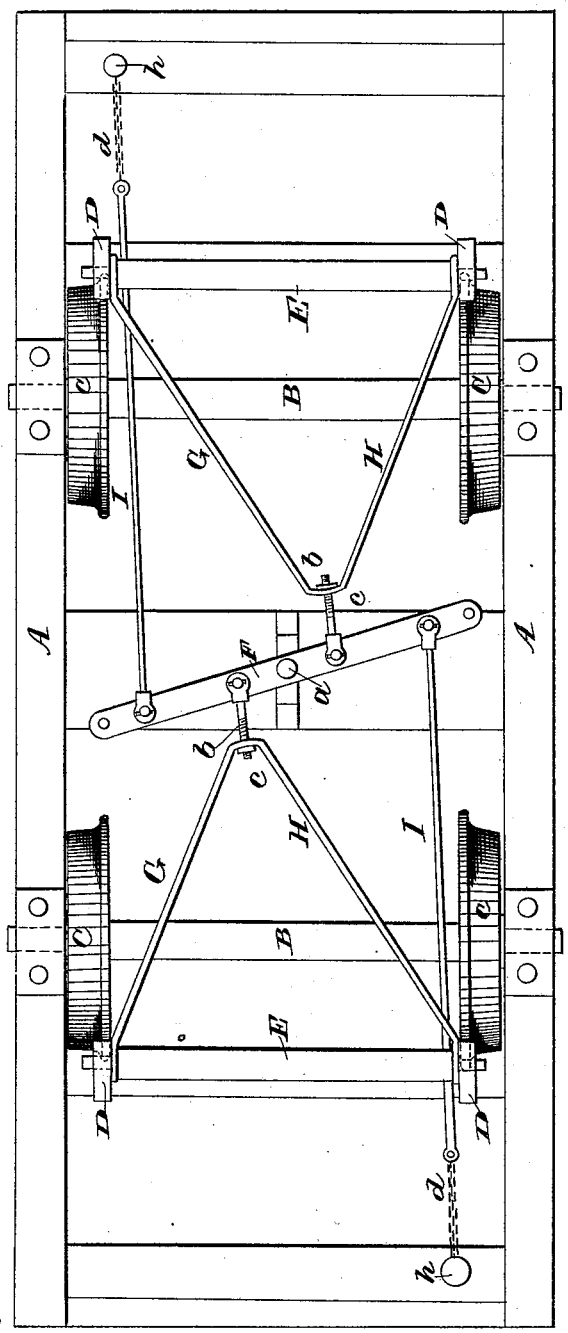
Witnesses
G. P. Hale Jr
G. H. Washburn
Inventor.
William L. Burt
By his attorney
R. H. Eddy

UNITED STATES PATENT OFFICE.

WM. L. BURT, OF BOSTON, MASSACHUSETTS.

IMPROVEMENT IN CAR-BRAKES.

Specification forming part of Letters Patent No. 49,082, dated August 1, 1865.

*To all whom it may concern:*

Be it known that I, WILLIAM L. BURT, of Boston, in the county of Suffolk and State of Massachusetts, have invented a new and useful Improvement in Brake Mechanism for Railway-Carriages; and I do hereby declare the same to be fully described in the following specification and represented in the accompanying drawing, which denotes an under-side view of a railway-carriage platform and wheels provided with my improved brake-operating mechanism.

In the said drawing, A denotes the platform of the carriage, B B are the two axles, and C C C C are the wheels, all of such being arranged and applied together in the usual manner.

To the flange or face of each wheel there is a brake-head, D, the brake-heads of each pair of wheels of each axle being connected by or applied to a rod or bar, E.

A lever, F, has its fulcrum $a$ arranged at the center of the platform, and its two arms connected with two windlasses, K K, by rods I I and chains $d\ d$, such windlasses being arranged at opposite ends of the platform.

Instead of connecting each arm of the lever F with one of the brake-bars E by a single rod going to the middle of such bar, as has heretofore been the custom, I make the connection by means of two radial bars, G H, which are joined together and receive a screw, $b$, through their junction, such screw being jointed to the lever. A nut, $c$, screwed on the screw, not only serves, with the screw, to connect the two rods G H to the lever, but to properly adjust the parts, as the brake-heads may become more or less worn by their action against the wheel or flanges.

The rods G H are either to be directly joined to the brake-heads or to the bar or beam E, and close to the said brake-heads.

By revolving either of the windlasses the brakes will be drawn up to the wheels. By having the two rods G H joined together and connected to the brake-heads or to the bar E, and close to such heads, I am enabled, in lieu of a stiff and heavy bar or beam of iron or wood, to employ a light iron bar or rod for connecting the two brake-heads of each pair of wheels. I also obviate all danger of breakage of the bar or beam and produce such a direct strain on the brake-heads as to prevent unequal wear of the wheel-flanges. Furthermore, by dispensing with the use of the wooden bar or beam I avoid the danger of its being burned by the brake-heads when they may become unduly heated by friction against the wheels. The arrangement of the adjusting screw and nut with reference to both the rods G H enables it to operate each of them at once, and thus renders a separate adjusting screw and nut for each rod unnecessary.

What I claim is—

1. The combination and arrangement of the rods G H with the brake-heads, the lever $b'$, and the windlass mechanism for operating such lever.

2. The arrangement and combination of the adjusting screws and nuts $b\ c$ with the lever F and the rods G H, applied to the brake-heads, as specified.

WM. L. BURT.

Witnesses:
 R. H. EDDY,
 F. P. HALE, Jr.